March 6, 1956  E. THOMSON  2,737,549
INERTIA OPERATED SHOCK LOAD RELEASE SWITCH
Filed Aug. 25, 1952  2 Sheets-Sheet 1
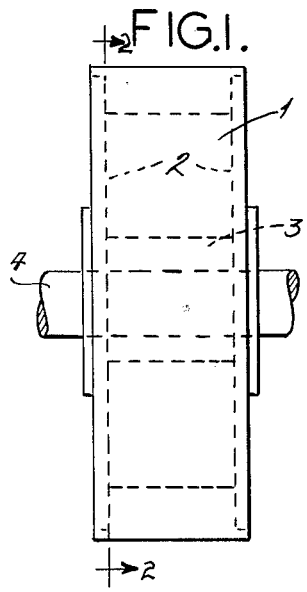
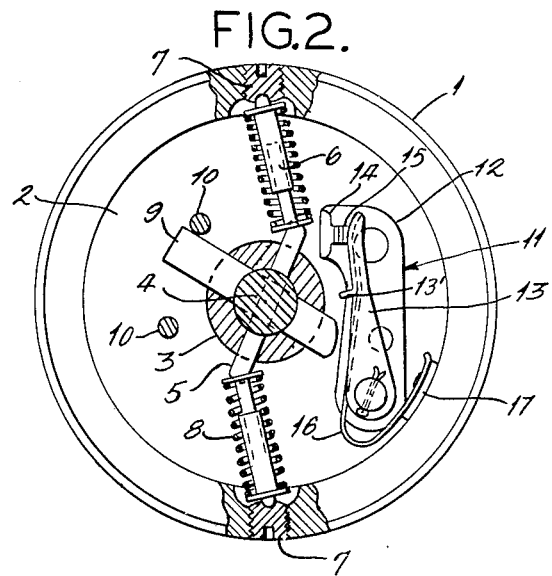
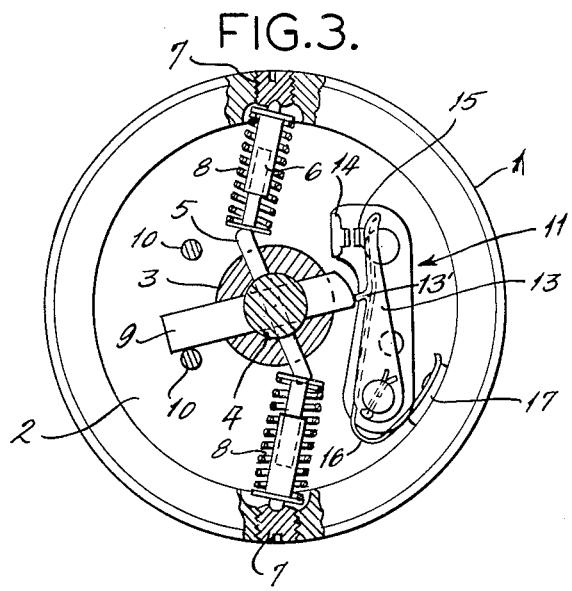
INVENTOR
EDWARD THOMSON
By Gravely Rueder, Woodruff & Heel
ATTORNEYS March 6, 1956 E. THOMSON 2,737,549
INERTIA OPERATED SHOCK LOAD RELEASE SWITCH
Filed Aug. 25, 1952 2 Sheets-Sheet 2

INVENTOR
EDWARD THOMSON
ATTORNEYS.

United States Patent Office 2,737,549
Patented Mar. 6, 1956

2,737,549

INERTIA OPERATED SHOCK LOAD RELEASE SWITCH

Edward Thomson, Mount Vernon, Ill.

Application August 25, 1952, Serial No. 306,121

7 Claims. (Cl. 200—61.5)

This invention relates to circuit breakers and is more particularly directed to a switch for interrupting an electrical circuit for a machine drive motor wherein same will be disconnected from the line when the driven machine encounters a shock load.

The object of this invention is to provide a circuit breaker for a machine wherein the motor will be disconnected from the power line when the driven machine has a shock load imposed thereon.

Another object of the invention is to provide a rapid acting inertia operated switch for the electric motor of a machine wherein a small motion of the inertia device relative to machine drive will operate the switch.

A further object of the invention is to provide a mechanism for resetting the inertia switch following an opening thereof by a suddenly imposed shock load in the machine operated by the driving motor controlled by an inertia switch.

The invention consists in the provision of an annular inertia device mounted for relative rotation about a driven member and normally held in position with respect thereto by a plurality of over-center springs, the inertia device operating a switch interrupting a circuit for a motor driving the driven member, the inertia switch containing means for resetting or closing same following its actuation.

In the drawings:

Fig. 1 is a side view of the inertia switch,

Fig. 2 is a section view taken substantially along the line 2—2 of Fig. 1 showing the switch in closed position, Fig. 3 is a view similar to Fig. 2 showing the switch in open position.

Figure 4:
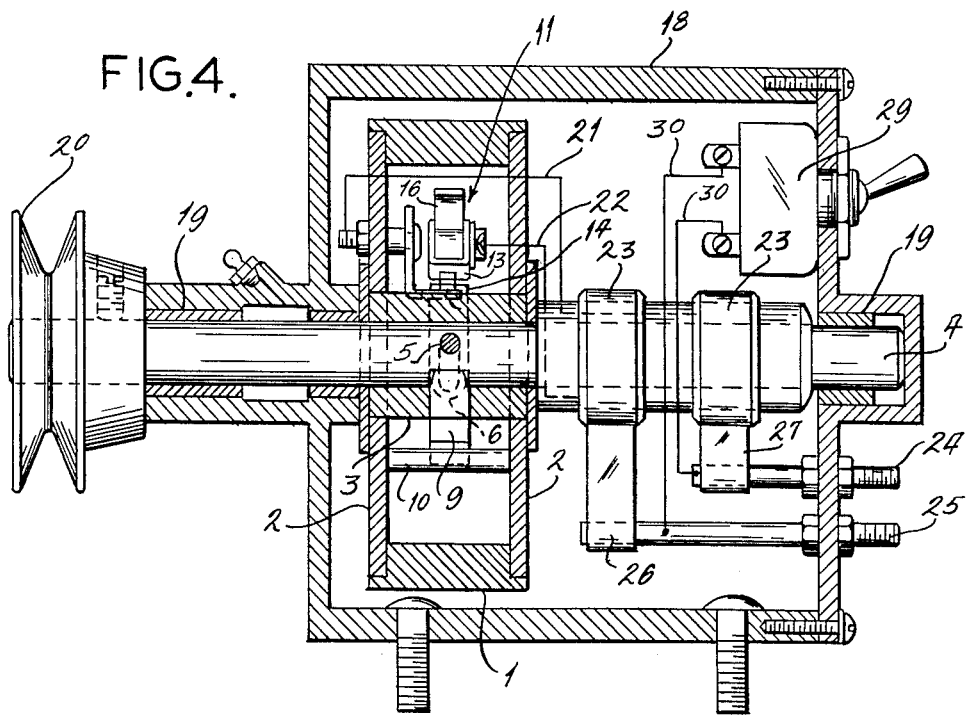
Fig. 4 is a sectional assembly view showing the assembled inertia switch and resetting mechanism.

The invention is embodied in the several views of the drawings in which 1 is an annular inertia member having considerable weight or mass and that is rotatably supported on discs 2 supported on a hub structure 3 suitably secured to a shaft 4. The hub 3 is provided with a pin 5 that extends therethrough radially. The ends of the pin 5 engage spring supporting pins 6 that extend between the ends of the pin 5 and screws 7 threaded into the inertia member 1. The radially inward end of the spring supporting pin 6 is suitably socketed so that it will remain in contact with the complementary shaped end of the pin 5 so that regardless of the angular relationship of the pin 5 with respect to the spring supported pin 6 it will always remain in contact therewith. A spring 8 surrounds the pins 6 and is adapted for imposing a force on the ends of pin 5. In order to cause the spring 8 to apply force to the pin 5 each pin 6 is made up of two parts that telescope one within the other so that the spring tension on each pin 6 can be varied by the adjustment of the screws 7 in the inertia member 1.

The hub 3 is provided with another pin 9 that is engageable with a pair of stops 10 secured to one of the discs 2. The stops 10 limit the rotational movement of the shaft 4 relative to the inertia member 1 and the discs 2 so that the device will at all times keep pins 6 in engagement with pin 5 irrespective of the relative rotational position of the parts.

The pin 9 also serves as a mechanism for opening and closing a switch 11 mounted on one of the discs 2, preferably the same one on which the stops 10 are carried. The switch is made up on the order of the make and break switches appearing in the distributors of automotive vehicles and comprises a switch base 12 fixed to the disc in any suitable manner. Pivotally supported on the switch base is a movable member 13 and each of the switch members is equipped with contacts 14 and 15 when the circuit is broken during the operation of the switch mechanism, the contact 15 being suitably secured to base 12. Suitable leads are connected to each of the contacts and a spring 16 acts on the movable member 13 to urge it into engagement with the contact 14 on the switch base 12. The spring 16 is anchored on the inertia member 1 and a suitable insulation 17 is provided to prevent the short circuiting of the switch contacts. The movable member 13 is actuated by the pin 9 acting on a wear member 13' mounted on movable member or arm 13 for separating the contacts in one position of adjustment of the switch and the spring 16 acts on member 13 for reversely moving same for engaging the contacts in another position of the adjustment of the device.

Figure 5:
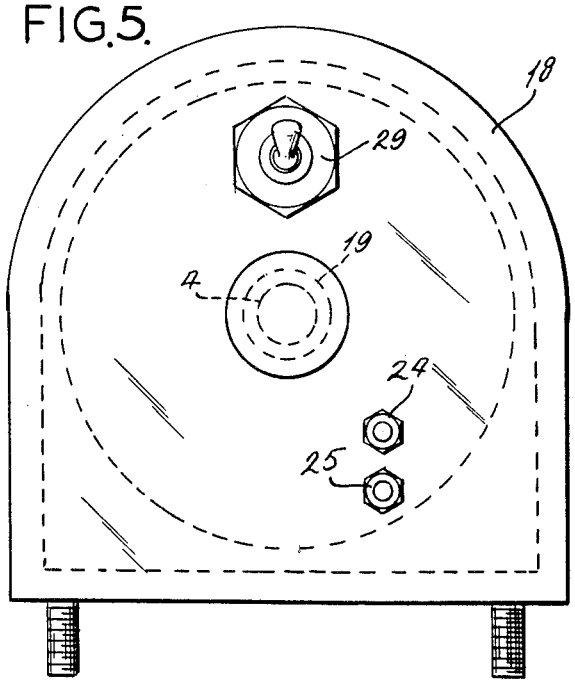
Fig. 5 is an end view thereof looking toward the left in Fig. 4.

The entire switch assembly is shown in Fig. 4 and Fig. 5 of the drawings in which a casing 18 is provided that is securable to the frame of the machine containing the mechanism to be protected by the switch. The shaft 4 is mounted in suitable bearings 19 and a pulley 20 is secured to one end of the shaft. This pulley is driven from some operative part of the machine driven by a suitable motor carried by the machine. The leads 21 and 22 previously generally referred to are electrically connected with the contacts 14 and 15 of the switch described above. These leads are connected to conducting rings 23 secured to the shaft 4. One end of the shaft 4 has brush supports 24 and 25 suitably mounted therein each of which carries a brush 26 and 27. The brushes contacting the brush rings 23 complete the circuit to the outgoing leads 28. A manually operated switch 29 is secured to the end wall of casing 4 and its leads 30 are connected to the brush supports 24 and 25. The purpose of this manually operated switch is to close the circuit for the operation of the mechanism of which the inertia switch forms a part after the cause of any circuit interruption by the inertia device has been removed.

The operation of this device depends upon the imposition of a shock load on the machine of which the above described mechanism is a part. Under normal operations the inertia switch is in the condition shown in Fig. 2 of the drawings, namely when the contacts 14 and 15 are in engagement with each other. It is assumed that a shock load has been imposed on the shaft which manifestly will, if the deceleration rate is sufficiently great, so sharply reduce the rate of rotation that the inertia member 1 by reason of its relatively large mass will continue its normal rotation. During the first part of the rotation of the inertia member 1 with respect to the driven part of the device the springs 8 will be energized or compressed because the space between the adjusting screw 7 and the ends of the pin 5 is reduced. When the inertia member 1 has rotated to the point where each of the pins and the adjusting screws 7 and the pin 5 are in axial alignment the springs will be fully energized. When the pins 6 and 5 and screws are in their center position they are in diametrical alignment, the springs 8 will be fully energized and after continued relative rotation will then complete the relative motion of the inertia member 1 with respect to the driven member or element of the inertia switch. This motion will continue until the pin 9 engages one of the stops 10, the one opposite from which pin 9 started, thus limiting the relative movement thereof. When the motion has been completed the end of the pin 9 opposite that which is engaged by the stop 7 will have swung the movable member 13 of the switch secured to one of the discs 2 so that the contacts are separated thus opening the circuit to the motor that is driving the machine, the machine being a part of the invenion and thus stops the operation thereof to permit the operator to remove the cause of the interruption.

The leads 21, 22, conducting rings 23, brushes 26 and 27 and leads 28 form part of the motor circuit and since the contacts 14 and 15 have been interrupted the motor must of necessity stop.

After the cause of the interruption has been removed the machine is then in condition for continued operation. This is initiated by closing the switch 29 that short circuits the open contacts 14 and 15. The motor connected to the pulley 20 will cause the shaft and parts associated therewith to rotate relative to the inertia member 1 which by reason of its greater mass will lag behind the shaft rotation. This relative rotation will again energize the springs 8 causing the parts of the pins 6 to telescope relative to each other re-energizing the springs 8 during the first part of the relative motion of the inertia member 1 and the shaft 4 and after each of the pins 5, 6 and the adjusting screws 7 are in diametrical alignment will after a slight motion in the same direction cause the spring 8 to complete this relative motion until the pin 9 re-engages the stop 7 as shown in Fig. 2 of the drawing wherein the contacts 14 and 15 are again in engagement with each other. The switch 29 is then opened so that in the event that the inertia mechanism opens the circuit that the switch 29 will not short circuit the inertia mechanism and attempt to restart the motor before the cause of the interruption has been removed. The mechanism provides a quick method for the disconnection of the motor from the power source and the machine driven thereby that is subjectable to shock loads that ordinarily would not open the circuit breaker protecting the mechanism. This device will only operate when the shaft 4 is decelerated so rapidly that the momentum of the inertia member will rapidly overrun the shaft 4 and thus open or close a switch carried by one of the discs 2 thereby affording complete electrical protection for the mechanism. The tension on spring 8 determines the rate of reduction in speed needed to cause the inertia member to actuate the switch. Tension of spring 8 governs reduction in speed needed to separate switch points 13 and 14 and determines when reset becomes effective. Regardless of the amount of load gradually applied to the motor for operating the shaft 4 under normal conditions the mechanism will operate without interruption. The speed of the drive motor may be gradually reduced to the point wherein the fuse or usual overload circuit breaker will interrupt the motor circuit. The inertia operated mechanism will not function because there will be no relative motion between the inertia member 1 and the shaft 4. This mechanism thus complements the usual circuit breaking mechanisms and thereby affords the operator of the machine a complete protection of his device.

The speed of the operation of the inertia member 1 is so fast that ordinary meters fail to show any voltage change or current variation. The device supplements the usual protective measures for a motor drive. Breakage of drills, taps, reamers, boring tools and similar devices is prevented, when jammed into a work piece, when hard or tough ductile spots are encountered or wherever the cutting tool or member being driven has its rotation quickly arrested. Prevention of tool breakage is effectively stopped by the aforesaid device.

The mechanism described above is reversible in its operation and is not restricted in its direction of rotation and is capable of opening or closing a circuit.

The inertia ring has been defined in part as having a mass greater than the driven member. The device will work equally well when the inertia ring mass is less than that of the driven member. The mass of the inertia is not to be construed as a term of limitation.

What I claim is:

1. An inertia operated switching device comprising a driven member, an annular member concentrically arranged therewith and capable of rotation relative thereto, a plurality of over-center operated springs connected between said annular member and said driven member, a switch in said device; and means on said driven member engageable with said switch for actuating same when the annular member rotates relative to said driven member, said means on said driven member being normally disengaged from said switch and the springs being energized during the first part of the relative motion and assisting in completing the motion during the latter part thereof.

2. An inertia operated switching device comprising a driven member, an inertia device rotatable relative thereto, a plurality of over-center springs connected between said driven member and said inertia device for controlling the relative motion therebetween, a make and break switch mounted in said device, means mounted on said driven member for actuating the make and break switch when the inertia device moves relative to said driven member said means mounted on said driven member being normally disengaged from said switch; and means for limiting the relative motion between said inertia device and said driven member.

3. An inertia operated switching device comprising a driven member, an annular inertia member having a mass greater than that of the driven member, said inertia member being rotatable relative to said driven member into either of two positions, spring operated means connected between said annular member and said driven member to act on said inertia member to force the latter into either of its said positions, means for adjusting the tension of said springs for controlling the speed at which said annular member will rotate relative to said driven member, a switch mounted in said device, and a switch actuating lever on said driven member that operates said switch when the driven member and annular inertia member move relative to each other, said lever being normally disengaged from said switch in one position of said inertia member.

4. An inertia operated switching device comprising a driven member, a ringlike member having a large mass, a pair of discs for rotatably supporting said ringlike member on said driven member, a plurality of over-center springs disposed between said driven member and said ringlike member, means for adjusting the tension of said springs for determining when the ringlike member will rotate relative to said annular member, a switch mounted on one of said discs, a lever mounted in said driven member for operating said switch when said ringlike member moves relative to the driven member said lever being normally disengaged from said switch; and a switch for short circuiting said switch on said disc for starting a motor connected to the driven member, the motor on starting reversely moving said ringlike member thus causing said lever to operate said switch on said disc.

5. An inertia operated switching device comprising a driven member, an annular inertia mass mounted for rotation with or relative to said driven member, a plurality of over center springs connected between said driven member and the annular inertia mass; and a switch and switch actuating means disposed in said device to be operable by the relative movement of said driven member and said annular inertia mass said switch having normally closed circuit making contacts and said actuating means being normally disengaged from said switch.

6. An inertia operated switching device comprising a driven member, an annular inertia mass mounted for rotation with or relative to said driven member, a plurality of over center springs connected between said driven member and the annular inertia mass, a normally closed switch mounted in said device; and a pin carried by said driven member in position normally disengaged from said switch but movable with said driven member for opening said switch upon relative movement of said driven member and said inertia mass.

7. An inertia operated switching device comprising a driven member, an annular member concentrically arranged therewith and capable of rotation relative thereto, a plurality of over-center operated springs connected between said annular member and said driven member, a switch in said device, means on said driven member normally disengaged from said switch but engageable with said switch for actuating same when the annular member rotates relative to said driven member, spaced stops in said device in position to be engaged by said means to limit relative rotation between said driven member and said annular member, the springs being energized during the first part of the relative motion and assisting in completing the motion during the latter part thereof; and means for short circuiting said switch in said device to permit a motor controlled by said switch to be started, the initial relative movement of the annular member and said driven member closing said switch.

References Cited in the file of this patent
UNITED STATES PATENTS

| | | |
|---|---|---|
| 2,311,856 | Newell | Feb. 23, 1943 |
| 2,406,427 | Leonard | Aug. 27, 1946 |
| 2,539,736 | Fraser | Jan. 30, 1951 |